United States Patent [19]

Leigh-Monstevens

[11] Patent Number: 4,590,765
[45] Date of Patent: May 27, 1986

[54] HYDRAULIC CYLINDER MODULAR STRUCTURE

[75] Inventor: Keith V. Leigh-Monstevens, Troy, Mich.

[73] Assignee: Automotive Products plc, Warwickshire, England

[21] Appl. No.: 633,462

[22] Filed: Jul. 23, 1984

[51] Int. Cl.⁴ .............................................. B60T 11/26
[52] U.S. Cl. ...................................................... 60/585
[58] Field of Search ............... 60/585, 588, 592, 533; 92/169

[56] References Cited

U.S. PATENT DOCUMENTS 1,885,580 11/1932 Bradbury .............................. 60/585
4,294,072 10/1981 Flynn ................................... 60/585
4,474,005 10/1984 Steer .................................... 60/585

FOREIGN PATENT DOCUMENTS 0088019 9/1983 European Pat. Off. .
171425 5/1960 Sweden ................................. 60/585
285559 1/1953 Switzerland ......................... 60/585
626073 7/1949 United Kingdom .
1051512 12/1966 United Kingdom .
1592306 7/1981 United Kingdom .
2141498 12/1984 United Kingdom .

Primary Examiner—Abraham Hershkovitz
Attorney, Agent, or Firm—Hauke and Patalidis

[57] ABSTRACT

A modular structure for a hydraulic cylinder permitting the cylinder to be used in combination with a reservoir of hydraulic fluid either installed on the cylinder itself or at a remote location with a conduit connection to the cylinder. The cylinder is provided with a peripherally threaded portion over which a tubular member formed integral with the reservoir, or in the alternative, provided with a connector for connection of the cylinder to a remotely located reservoir is fitted. The tubular member-fluid reservoir assembly and the tubular member-connector assembly are interchangeable.

6 Claims, 10 Drawing Figures

U.S. Patent   May 27, 1986   Sheet 1 of 2   4,590,765
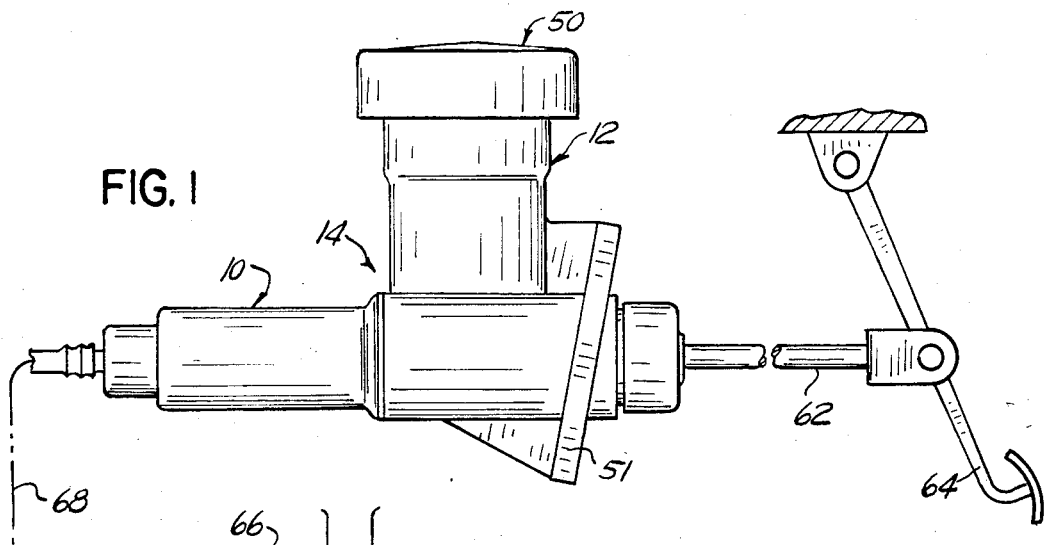
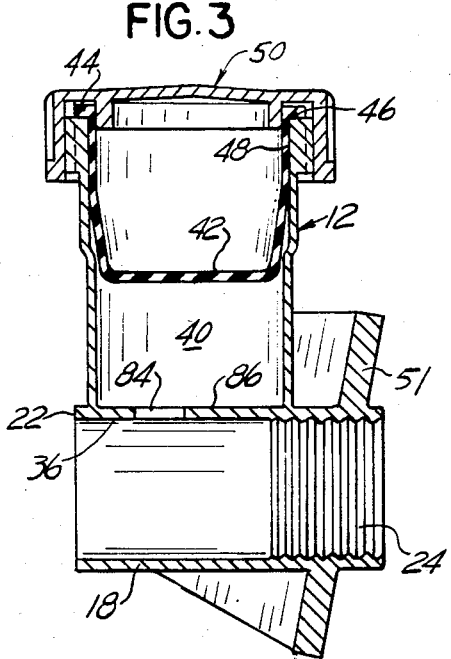
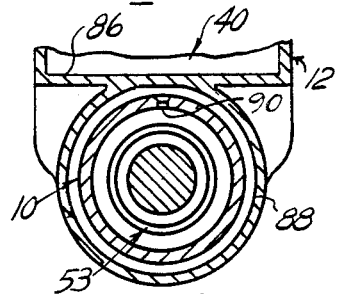
FIG. 5
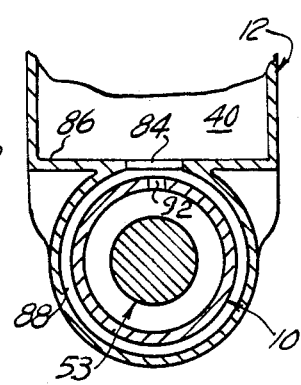
FIG. 4
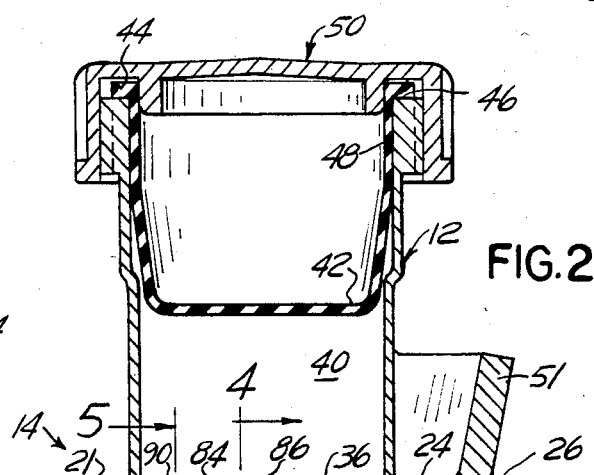
FIG. 2
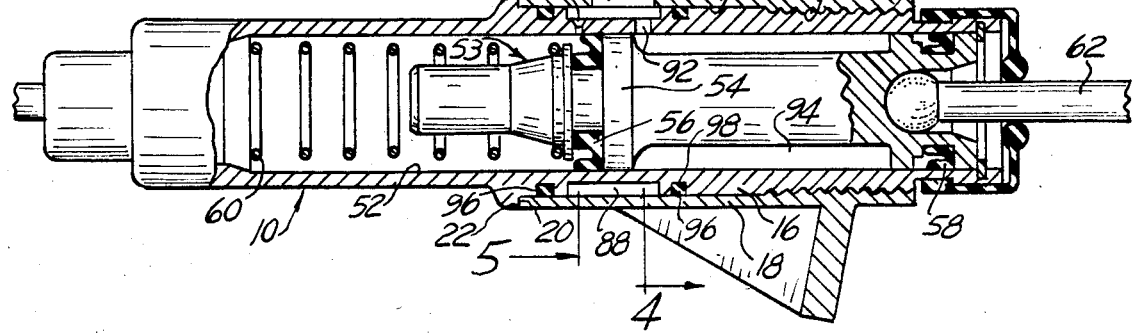

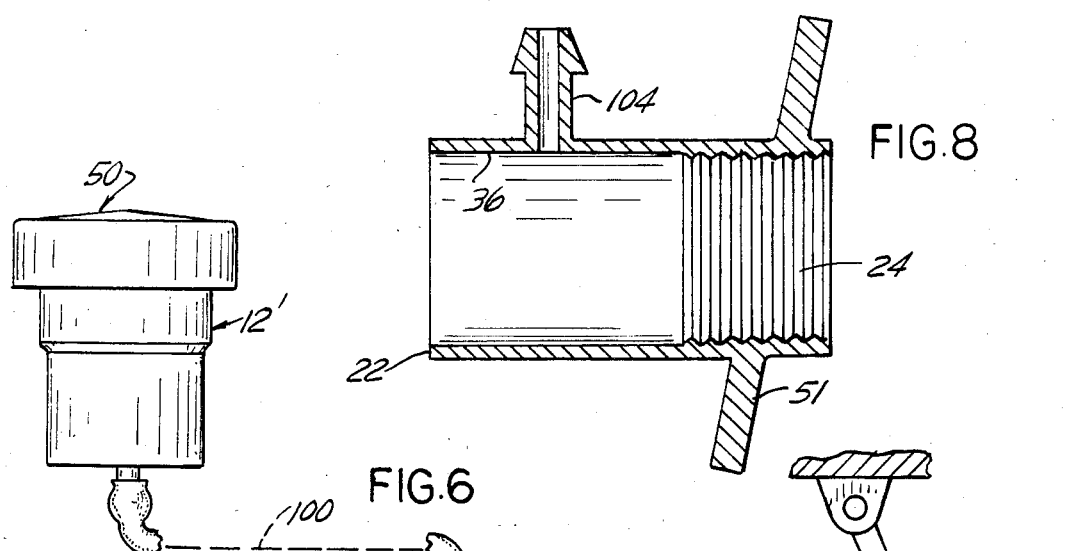
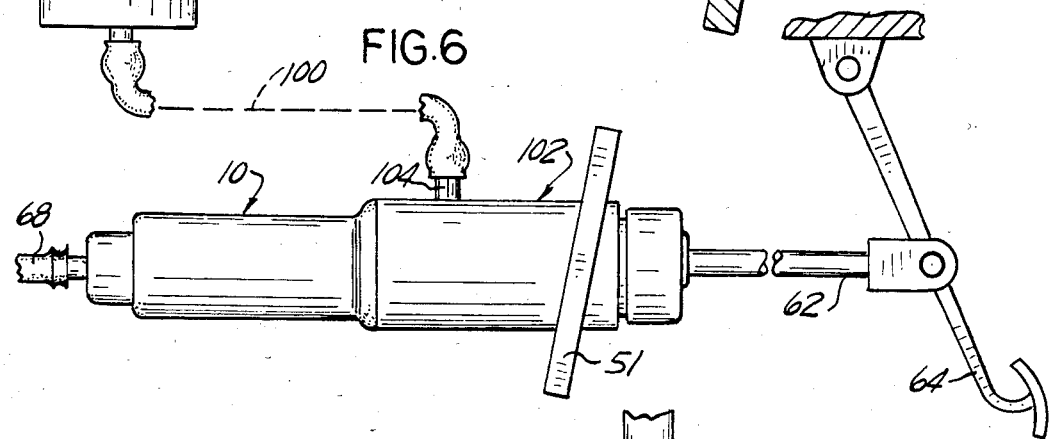
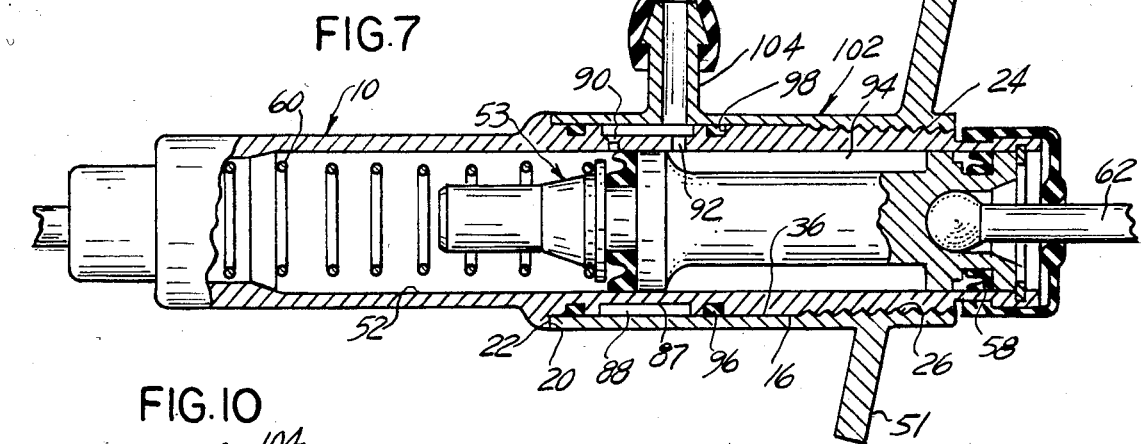
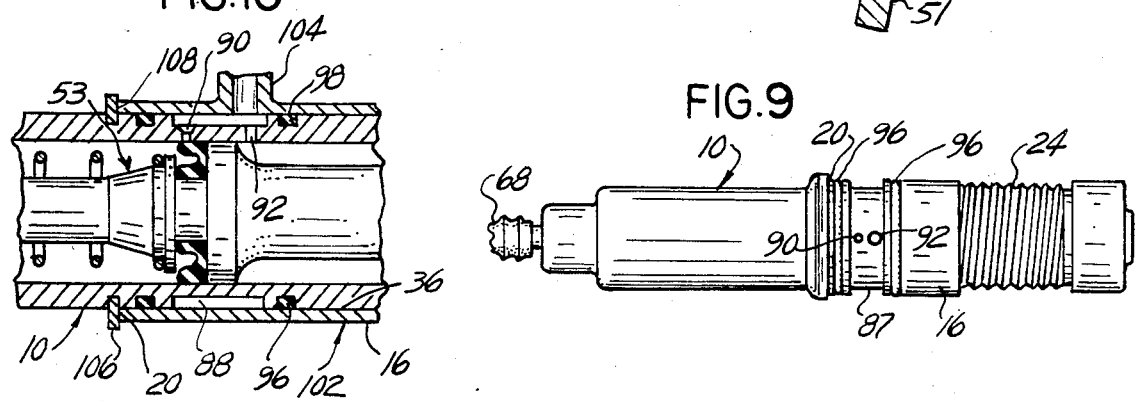

HYDRAULIC CYLINDER MODULAR STRUCTURE

BACKGROUND OF THE INVENTION

The present invention relates to apparatus for transmitting mechanical movement from one location to another, and which utilizes hydraulic fluid as a transmitting means. More particularly the invention pertains to a force transmission device employing hydraulic cylinders and interconnecting the cylinders, whereby pressure generated in one cylinder is transmitted to the other to achieve a desired movement or operation at a location remote from that at which the pressure force originates.

Such devices may be used for effecting mechanical operations in motor vehicles. For example, hydraulic cylinders are used in actuating mechanical clutches. In such use, a "master" cylinder is utilized to originate pressure-flow which is transmitted by a conduit to a "slave" cylinder having an output member connected to the clutch release mechanism. The master cylinder is usually operated by means of a foot pedal.

It is common practice to mount the master cylinder on a bulkhead or other structure forming part of a cab, or other driver enclosure, while the slave cylinder is mounted on the clutch housing or the gear box housing of the vehicle. It is known to supply one of the cylinders with hydraulic fluid from a reservoir which provides a continuous means of replenishing the hydraulic fluid system, the object being to insure continued proper operation.

It is also known to provide a remotely positioned, i.e. separate hydraulic fluid reservoir, connected by a conduit to a cylinder, as well as a reservoir that is integral with a cylinder and has more direct fluid connection with the cylinder such as by means of openings extending through contacting walls.

In some instances, one arrangement is desirable, whereas in other instances the other is preferred. Usually the reservoir is connected to the master cylinder. Master cylinders known in the art are either of one design having a reservoir integral therewith or of another distinct design, so far as structure is concerned, suited for connection to a remotely located reservoir. In effect two distinct master cylinders and two distinct reservoirs must be made by suppliers to accommodate the requirements of their vehicle manufacturing customers.

DESCRIPTION OF THE PRIOR ART

U.S. Pat. No. 4,407,125 discloses a clutch actuating hydraulic system employing a master cylinder, adapted to be mounted on a vehicle bulkhead, and a slave cylinder, the cylinders being interconnected by a conduit, and wherein the master cylinder has a hydraulic fluid reservoir integral therwith. Hydraulic fluid thus can be replenished as needed directly from the reservoir to the master cylinder without intervening tubing.

SUMMARY OF THE INVENTION

The instant invention provides a single master cylinder structure useful both for installations where a unitary cylinder-reservoir assembly is possible and desirable, as well as for installations where a remotely located reservoir, with respect to the cylinder, is necessary or otherwise desired.

According to the invention, a cylinder and reservoir construction is provided which can be either securely joined to each other to form a single cylinder-reservoir unit or which can be positioned separate from each other and connected by a conduit without structural modification of either.

Further, according to the invention, simplicity of structure is achieved as well as secure reliable means of joining the cylinders and reservoirs to each other.

The concept includes provision of a cylinder having an exterior configuration that matches a reservoir having a mating configuration such that they can be readily interlocked to provide a single unit, or which can be separately used. According to the invention there is also provided a third element of simple design that can be readily securely attached to the same cylinder in place of a reservoir to serve as a connector for joining the cylinder to a reservoir in installations where the two are remotely located from each other.

BRIEF DESCRIPTION OF THE DRAWINGS

FIG. 1 is a schematic side elevation of an example of master and slave cylinder assembly for operating a motor vehicle mechanical clutch, and showing a form of cylinder-reservoir assembly according to the invention;

FIG. 2 is a longitudinal sectional view of the cylinder-reservoir assembly of FIG. 1;

FIG. 3 is a longitudinal sectional view of the reservoir portion thereof;

FIGS. 4 and 5 are fragmentary sections taken respectively along lines 4—4 and 5—5 of FIG. 2;

FIG. 6 is a view similar to FIG. 1, but illustrating a modification wherein the master cylinder is provided with a remotely located reservoir;

FIG. 7 is a longitudinal sectional view of the cylinder of FIG. 6;

FIG. 8 is a longitudinal section through the hydraulic fluid conduit connector portion of FIG. 7;

FIG. 9 is a side elevation of a modular hydraulic cylinder according to the present invention; and FIG. 10 is a view similar to FIG. 9 and illustrating a modification thereof.

DETAILED DESCRIPTION OF THE PREFERRED EMBODIMENTS

Referring now to FIG. 1, a cylinder-reservoir combination is illustrated as comprising a hydraulic cylinder 10 and a hydraulic fluid reservoir 12 forming a single assembly 14. The cylinder 10 has a cylindrical exterior surface 16 along at least a portion of its length as shown at 16, FIGS. 2 and 9. The reservoir 12 has a mating integral tubular portion 18. The cylindrical surface portion 16 of the cylinder terminates in a shoulder abutment 20 at one end, defined on the side face of a flange 21, while the tubular portion 18 of the reservoir 12 has a terminal abutting annular face 22 at one corresponding end, FIG. 2. The other end of the reservoir tubular portion 18 is provided with an internally threaded section 24. The cylinder 12 has a mating peripherally threaded section 26. The maximum diameter of the cylinder threaded section 26 is slightly less than the diameter of the cylinder cylindrical surface 16 and, correspondingly, the minor diameter of the internally threaded portion 24 of the tubular member 18 is less than the diameter of the bore 36 of the reservoir tubular member 18. In this manner, the reservoir tubular portion 18 may be slipped over the cylinder cylindrical peripheral surface 16 and the respective threaded portions 24 and 26 engaged by rotating the reservoir 12 relative to the cylinder 10 until the annular abutment 22 of the reservoir tubular member 18 engages the surface of the cylinder shoulder abutment 20.

The hydraulic fluid reservoir 12 per se may generally be according to the structure disclosed in U.S. Pat. No. 4,407,125 or, preferably, in copending application Ser. No. 599,248, now U.S. Pat. No. 4,506,507, issued Mar. 26, 1985, both assigned to the same assignee as the present application. The reservoir 12 comprises a hydraulic fluid chamber 40 separated from the ambient by a flexible cup-shaped diaphragm member 42. The diaphragm member 42 has a lip 44 adapted to seat on the flange 46 of the reservoir open top 48 and be secured thereto by a closure cap 50, all in a known manner. The flexible diaphragm 42 is exposed to atmospheric pressure through a vent port, not shown, in the closure cap 50. The flexible diaphragm 42 is preferably formed of a flexible impervious material such as neoprene.

The reservoir 12 is also provided with a mounting means such as a mounting flange 51, for the purpose of mounting on a bulkhead or the like. The mounting means may also take the form of a quick connect. twist and lock, structure as disclosed in co-pending application Ser. No. 387,019, filed June 10, 1982 now U.S. Pat. No. 4,488,701, issued Dec. 18, 1984, assigned to the same assignee as the present application.

The cylinder 12 has a bore 52 in which is reciprocably disposed a piston 53 having a spool 54 and seals such as 56 and 58. A compression coil spring 60, disposed between the end of the bore 52 and an extension of the spool 54, urges the piston 53 to the right as viewed in FIG. 2. The piston 53 is controllably displaceable by a rod 62, having an end connected to a foot pedal 64, for transferring hydraulic fluid from the cylinder 12 to a remotely located slave cylinder 66 through a flexible conduit 68 for operating, for example, a motor vehicle clutch release mechanism, not shown, by means of the slave cylinder output member 74.

As seen in FIGS. 2, 3 and 4, the hydraulic fluid reservoir 12 has an orifice 84 extending through its bottom wall 86. The cylinder 12 has a relatively wide peripheral groove 87 forming an annular chamber 88 cut into its exterior surface. The locations of the orifice 84 and of the chamber 88 are such that when the reservoir 12 is securely fastened onto the cylinder 12 as illustrated at FIG. 2 the orifice 84 and the chamber 88 are in fluid communication. A port 90 places the chamber formed in the cylinder bore 52 forward of the piston 53 in fluid communication with the annular space 88 and with the fluid chamber 40 of the reservoir 12 through the orifice 84 on the bottom of the fluid reservoir 12, such as to maintain the hydraulic apparatus constantly filled with fluid. As soon as the piston 53 is reciprocated such as to displace hydraulic fluid from the master cylinder 10 to the slave cylinder 66 through the conduit 68, the orifice or port 90 is obturated by the seal 56 and spool 54. A second orifice or port 92 disposed behind the spool 54, also places the annular space 88 in fluid communication with an annular chamber 94 formed in the cylinder bore 52 behind the piston spool 54, such that the chamber 94 is always filled with hydraulic fluid, as is well known in the art. A pair of O-rings 96, disposed in appropriate peripheral grooves 98 on both sides of the groove 87 forming the annular space 88, provide a leak-proof connection between the cylinder 10 and the reservoir 12.

FIG. 6 illustrates generally a master cylinder 10 provided with a remotely installed hydraulic fluid reservoir 12' connected to the master cylinder 10 via a flexible conduit 100. The master cylinder 10 is provided with a modular sleeve 102 having an appropriate fitting 104 to which is connected the end of the conduit 100. The sleeve 102, FIG. 8, is an exact replacement for the hydraulic fluid reservoir 12 of FIGS. 1-5, being provided internally with a smooth bore portion 36 having an internally threaded end portion 24 for engagement with the peripherally threaded portion 26 of the master cylinder 10, FIG. 7.

FIG. 8 illustrates the details of the sleeve 102, which is shown at FIG. 7 installed over the cylinder 10, and a comparison between FIGS. 2 and 7 immediately reveals that the structures of the cylinders 10 are identical.

As illustrated at FIG. 10, the annular abutment surface 20 engaged by the annular end face 22 of the connector annular sleeve 102 may, alternatively, take the form of a spring split ring 106 installed in an appropriate groove 108 formed in the peripheral surface of the cylinder 10. The side face of the split ring 106 thus defines the annular abutment 20 for the end face 22 of the connector sleeve 102 of FIG. 8 as well as of a tubular section 18 of the reservoir 12 of FIG. 3.

Having thus described the present invention by way of examples of structure thereof, modofications whereof will be apparent to those skilled in the art.

What is claimed as new is as follows:

1. A hydraulic cylinder assembly for a hydraulic apparatus, said hydraulic cylinder assembly consisting of a hydraulic cylinder having a circularly cylindrical housing and a separate detachable and interchangeable tubular member open at both ends and fitted over said cylindrical housing, said cylindrical housing comprising a peripherally recessed portion defining a first annular groove, a peripherally threaded portion disposed on one side of said first groove, an outwardly extending annular abutment shoulder on the other side of said first groove, a first annular seal disposed in a second peripheral groove between said one side of said first groove and said peripherally threaded portion, a second annular seal disposed in a third peripheral groove between said other side of said first groove and said annular abutment shoulder, and at least one port through the wall of said cylindrical housing leading in said first groove, and said detachable and interchangeable tubular member having a bore comprising a smooth portion engaged with said first and second annular seals, an internally threaded portion mating said externally threaded portion of said cylindrical housing and an end defining an annular face engaged with said abutment shoulder of said cylindrical housing when said tubular member is threaded over said cylindrical housing, said tubular member having an orifice in its bore for supplying fluid to said first groove and to the interior of said cylinder housing through said port through the wall of said cylindrical housing.

2. The hydraulic cylinder of claim 1 wherein said tubular member is formed integral with a reservoir of hydraulic fluid.

3. The hydraulic cylinder of claim 1 wherein said tubular member has a fitting for connection of said orifice with a remotely located reservoir of hydraulic fluid through a conduit.

4. The hydraulic cylinder of claim 1 wherein said tubular member has an integral mounting flange for mounting said cylinder on a support.

5. The hydraulic cylinder of claim 2 wherein said tubular member has an integral mounting flange for mounting said cylinder on a support.

6. The hydraulic cylinder of claim 3 wherein said tubular member has an integral mounting flange for mounting said cylinder on a support.

* * * * *

UNITED STATES PATENT AND TRADEMARK OFFICE
CERTIFICATE OF CORRECTION

PATENT NO. :  4,590,765
DATED     :  5/27/86
INVENTOR(S) :  Keith V. Leigh-Monstevens It is certified that error appears in the above–identified patent and that said Letters Patent are hereby corrected as shown below:

Col. 4, line 22, correct the spelling of "modifications".

Signed and Sealed this

Fourteenth Day of October, 1986

[SEAL]

*Attest:*

DONALD J. QUIGG

*Attesting Officer*  *Commissioner of Patents and Trademarks*